United States Patent [19]

Haldric

[11] Patent Number: 4,572,697
[45] Date of Patent: Feb. 25, 1986

[54] COUPLING COLLAR PRODUCED BY A BLANKING AND FOLDING OF A BLANK

[75] Inventor: Bernard Haldric, Vendome, France

[73] Assignee: NACAM, Vendome, France

[21] Appl. No.: 497,826

[22] Filed: May 25, 1983

[30] Foreign Application Priority Data

May 28, 1982 [FR] France ................................ 82 09378

[51] Int. Cl.[4] .......................... B25G 3/00; F16D 1/00
[52] U.S. Cl. ..................................... 403/344; 403/290
[58] Field of Search .......................... 403/373, 344, 290

[56] References Cited

U.S. PATENT DOCUMENTS

| 2,039,973 | 5/1936 | Morgan | 403/290 |
| 2,122,868 | 7/1938 | Morgan | 403/290 |
| 2,451,062 | 10/1948 | Booth | 403/290 |
| 2,723,141 | 11/1955 | Ricks | 403/290 |
| 4,016,770 | 4/1977 | Enters | 403/373 X |

Primary Examiner—Andrew V. Kundrat
Attorney, Agent, or Firm—Robert E. Burns; Emmanuel J. Lobato; Bruce L. Adams

[57] ABSTRACT

A coupling collar comprising a body in which are formed a passage 5, 6 for an element 12 to be coupled and means 8, 15 and 17 for clamping said collar to the element 12, wherein there is provided on said body a lateral tongue portion 9 constituting means for immobilizing the collar axially and as concerns rotation relative to the element to be coupled.

7 Claims, 5 Drawing Figures

COUPLING COLLAR PRODUCED BY A BLANKING AND FOLDING OF A BLANK

DESCRIPTION

The present invention relates to coupling collars and more particularly to a collar for coupling a motor vehicle steering tube to a shaft.

An object of the invention is to provide a coupling collar which ensures an effective clamping on substantially the whole of the perimeter of the parts to be coupled but may be made by simple blanking and folding operations and may be rendered rigid with one of the parts, such as the steering column tube, during all the operations such as storage and handling preceding the clamping.

The invention therefore provides a coupling collar comprising a body in which there is formed a passage for an element to be coupled and means for clamping said collar to said element, wherein there is provided on said body a lateral tab portion constituting means for holding said collar stationary axially and in rotation relative to said element to be coupled.

Further features of the invention will be apparent from the ensuing description with reference to the accompanying drawing which is given solely by way of example and in which:

FIG. 1 shows a blank 1 obtained by blanking it from a sheet of metal of suitable thickness and intended to form the collar according to the invention by a folding and forming operation.

Figure 1:
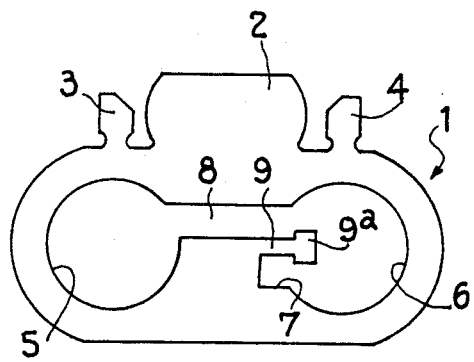
FIG. 1 is a plan view of a blank from which the collar according to the invention is made.

The blank 1 has a generally rectangular shape with rounded ends. It has on one of its sides a main projection 2 located in the middle of said side and two tabs 3 and 4 which are located symmetrically relative to the projection 2. The function of the projection 2 and of the tabs 3 and 4 will be explained hereinafter.

Formed in the vicinity of the rounded ends of the blank 1 are circular orifices 5 and 6 for the passage of one of the elements to be assembled by means of the collar according to the invention. Formed in the perimeter of the orifice 6 is a notch 7 which defines with a slot 8 interconnecting the orifices 5 and 6 and extending in a direction parallel to the line joining the centres of said orifices, a tongue portion 9 whose function will be explained also hereinafter.

The slot 8 is offset relative to the line joining the centres of the orifices 5 and 6 so as to enable the tongue portion 9 to have this line as an axis of symmetry. The tongue portion 9 has at its free end an enlarged portion 9a.

The blank 1 just described is made by a blanking and punching operation. It is thereafter folded so as to produce the collar shown in FIGS. 2 to 5.

The folding is effected around the axis of symmetry of the blank 1 perpendicular to the line joining the centres of the orifices 5 and 6. In this way there is obtained a collar comprising two parallel wings 10 and 11, the tongue portion 9 constituting an element for immobilizing the collar axially and as concerns rotation relative to the element on which it is mounted.

Figure 4:
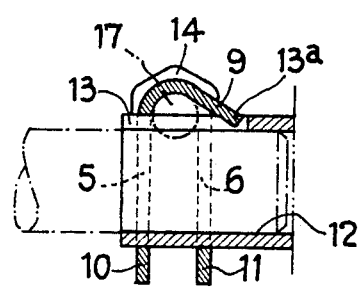
FIG. 4 is a sectional view taken along line 4—4 of FIG. 2.
Figure 2:
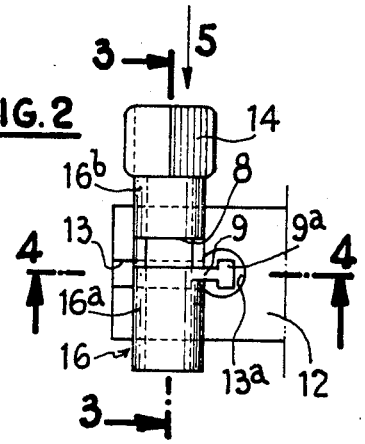
FIG. 2 is a top plan view of the finished collar mounted on a tube to be assembled.

In the embodiment shown in FIGS. 2 and 4, this element is formed by the end portion of a tube 12 in which is formed an axially extending slot 13 adapted to impart to the tube the resilience required for its clamping and employed for receiving the tongue portion 9. For this purpose, the slot terminates in a circular end 13a whose diameter is larger than the width of the slot 13, in which the enlarged portion 9a of the tongue portion 9 is engaged. As can be seen in FIG. 4, the tongue portion 9 engaged in the slot 13 immobilizes the collar axially and as concerns rotation relative to the tube 12. Consequently, the collar may be mounted on the tube and form with the latter an assembly which may be stored and handled before clamping with no risk of loss of the collar.

It will be understood that instead of employing the slot 13 there may be provided for immobilizing the collar on the tube a cavity in the tube for the tongue portion 9 of the collar separated by said slot.

Figure 3:
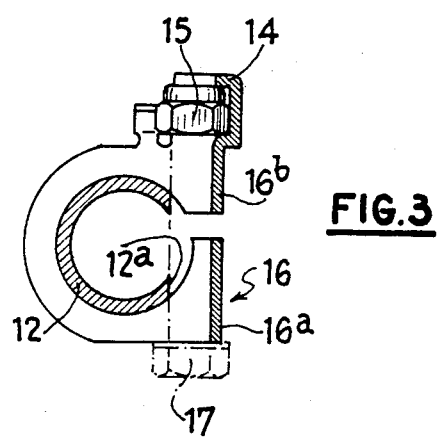
FIG. 3 is a sectional view taken along line 3—3 of FIG. 2.

As can be seen in FIGS. 2 to 5, the projection 2 is folded in such manner as to form a cavity or housing 14 for a nut 15, and the central rounded portion 16 of the collar interconnecting the wings 10 and 11 forms a passage for a clamping bolt 17 shown in dot-dash line in FIG. 3 and adapted to cooperate with the nut 15. FIG. 3 also shows that the tube 12 has a transverse recess 12a to allow the passage of the bolt 17 which may thus ensure a keying function between the tube 12 and the element with which it must be coupled shown in dot-dash line in FIG. 4.

Figure 5:
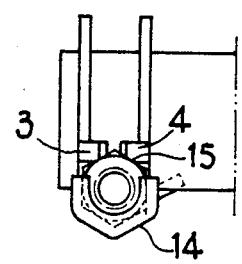
FIG. 5 is an elevational view of the cavity for the nut of the collar according to the invention.

The slot 8 interconnecting the two orifices 5 and 6 enables the two parts 16a and 16b of the central portion 16 of the collar to be moved toward each other so as to permit the clamping action of the bolt 17 and nut 15. The lateral tabs 3 and 4 are also folded as shown in FIG. 5 so as to immobilize the nut 15 in its cavity 14. This arrangement is particularly clear in FIG. 5.

The cavity 14 and the folded tabs 3 and 4 constitute also locking means preventing rotation of the nut 15.

It can be seen that the collar just described is particularly simple since it requires for its production only blanking, forming and folding operations.

Further, its clamping perimeter is particularly large since it is interrupted only by the slot 8 interconnecting the orifices 5 and 6 which imparts the essential resilience to the collar for the clamping.

Having now described my invention what I claim as new and desire to secure by Letters Patent is:

1. A coupling collar structure comprising a body defining a passage for an element to be coupled by the collar, means for clamping said collar on said element, and a lateral tongue portion constituting means for immobilizing said collar axially and as concerns rotation relative to said element to be coupled, said collar comprising two parallel wings defining orifices for the passage of said element to be coupled, an intermediate portion which interconnects the two wings and defines a slot interconnecting said orifices and constituting a passage for a clamping bolt which is part of said clamping means, said collar being formed from a blank of sheet material by folding said blank, said orifices and said slot interconnecting the orifices being punched in said blank, said lateral tongue portion being formed by a press operation on the blank and defined by a notch formed in a periphery of one of said orifices and by said slot interconnecting said orifices.

2. A collar structure according to claim 1, wherein the tongue portion has an enlarged end portion.

3. A collar structure according to claim 1, further comprising two lateral tabs formed when blanking out said blank and constituting, after a folding of the tabs, means for locking against rotation a nut which cooperates with said bolt and is part of said clamping means.

4. A collar structure according to claim 3, further comprising means defining a cavity for the clamping nut and formed by folding a lateral projection formed when blanking the blank.

5. A collar structure according to claim 4, wherein the two lateral tabs are cooperative with said nut so as to immobilize said nut in said cavity and are formed when blanking said blank symmetrically relative to the lateral projection forming said nut cavity.

6. A collar structure according to claim 1 mounted on a tubular element to be coupled, in particular a steering column tube, said tongue portion being engaged in a cavity formed in said tubular element.

7. A collar structure according to claim 6, wherein said cavity for said tongue portion is part of an end slot provided in the tubular element so as to impart to the tubular element a resilience required for the clamping thereof by the collar structure.

* * * * *